Oct. 2, 1962  R. F. NIMMO  3,056,415
COLLAPSIBLE TENT FOR AUTOMOBILES
Filed July 17, 1959  2 Sheets-Sheet 1
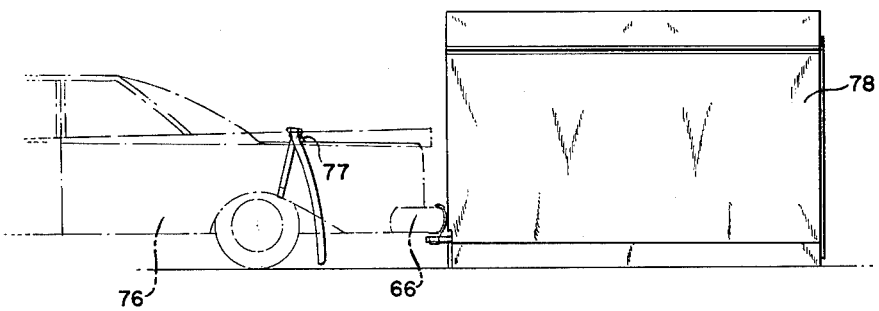
FIG.1.
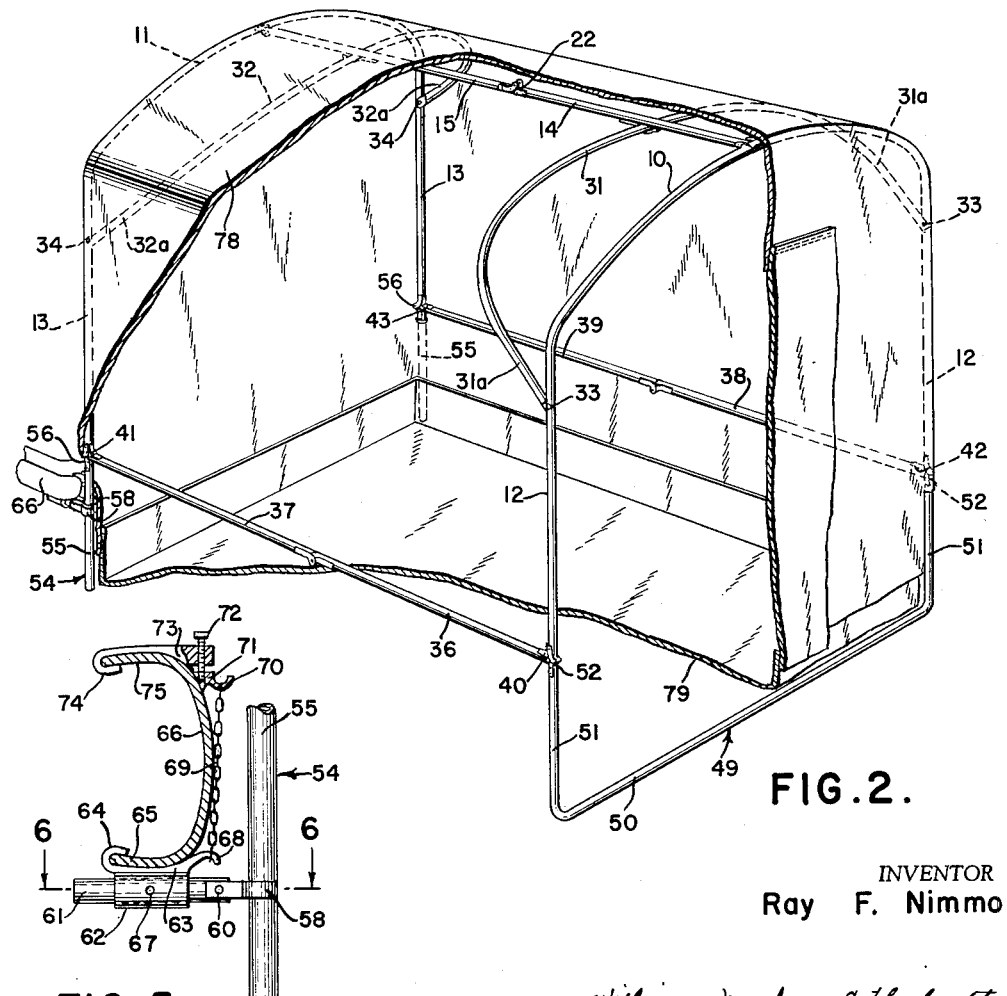
FIG.2.
FIG.5.
INVENTOR
Ray F. Nimmo
BY Wilkinson, Mawhinney & Theibault
ATTORNEYS Oct. 2, 1962 R. F. NIMMO 3,056,415
COLLAPSIBLE TENT FOR AUTOMOBILES
Filed July 17, 1959 2 Sheets-Sheet 2
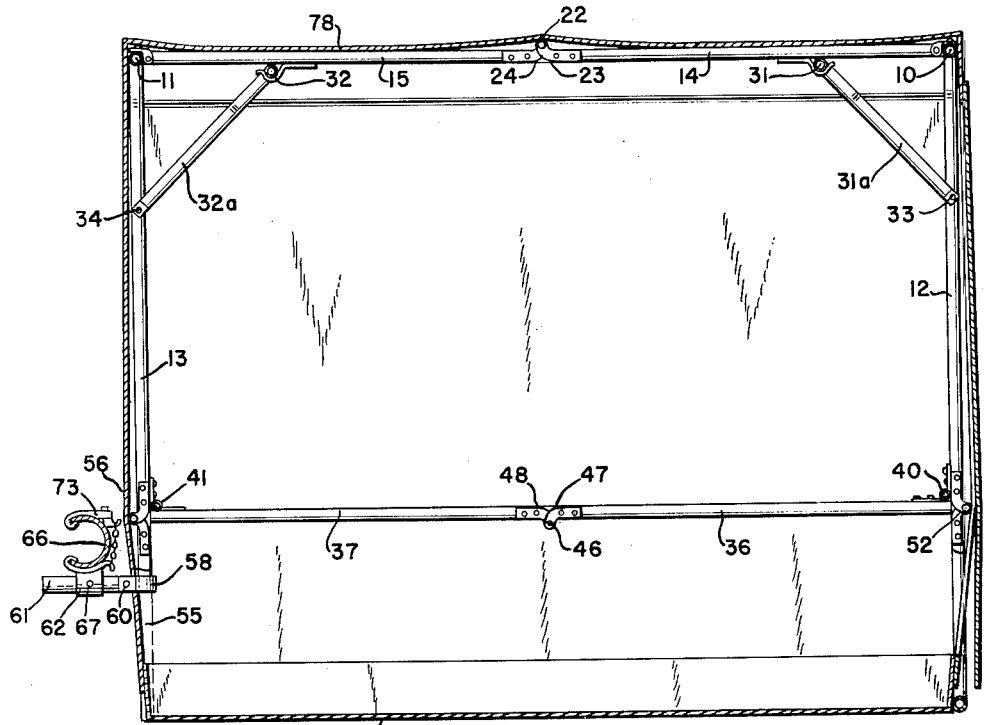
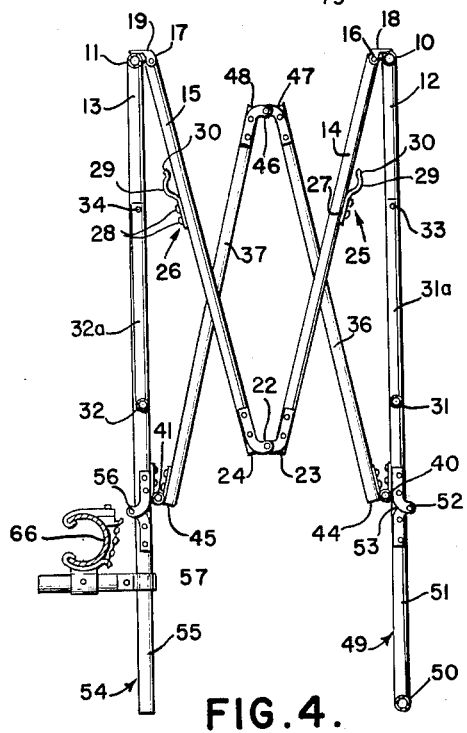
FIG.3.
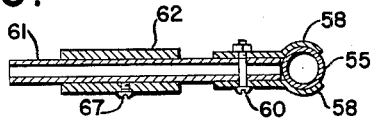
FIG.6.
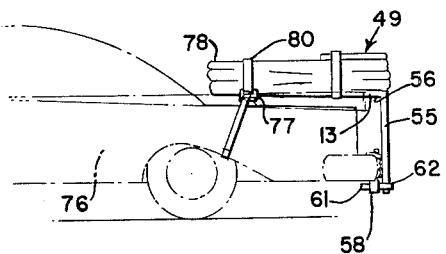
FIG.7.
INVENTOR
Ray F. Nimmo
BY Wilkinson, Mawhinney & Theibault
ATTORNEYS

United States Patent Office 3,056,415
Patented Oct. 2, 1962

3,056,415
COLLAPSIBLE TENT FOR AUTOMOBILES
Ray F. Nimmo, 511 "A" Ave. NE., Cedar Rapids, Iowa
Filed July 17, 1959, Ser. No. 827,899
2 Claims. (Cl. 135—4)

The present invention relates to collapsible tent for automobiles and has for an object to provide a collapsible tent structure and attaching means for attaching the same to the rear end of an automobile in such manner that the tent frame including the canvas or other canopy may be collapsed or knocked down and in a compact and folded condition made to rest upon the lid of the vehicle trunk in such low, compact mass that it will not extend in the path of the driver's vision through the rear window of the automobile.

Another object of the invention is to provide an improved collapsible frame for the tent with means for detachably securing the same in the erect or operative position, which means will also function in a capacity to co-act with the other members of the frame in distending and supporting the flexible roof of the canopy.

A still further object of the invention is to provide an improved attaching device for coupling the collapsible frame to the rear end of the vehicle, conveniently to the rear bumper thereof, with provision for adjustment of the various elements of the attaching device to the end that the same may be quickly and readily installed or detached and at the same time as the installation is made adjusted so that a pivotal connection between the attaching device and the collapsible tent frame may be brought to a position of substantial registry with the horizontal plane of the trunk lid to enable the frame in the collapsed condition to be folded over upon the trunk lid and secured thereto.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a fragmentary side elevation of an automobile showing a collapsible tent coupled thereto with the tent in erected position ready for occupancy.

FIGURE 2 is an isometric view of the collapsible tent frame in erected condition with portions of the canvas canopy broken away and shown in section.

FIGURE 3 is a longitudinal sectional view taken through the frame and canopy and the attaching device and showing the vehicle rear bumper in section.

FIGURE 4 is a sectional side elevational view of the collapsible frame partially collapsed and showing also the attachment to the bumper with the bumper illustrated in section.

FIGURE 5 is a side elevational view of the attaching device with parts broken away and parts shown in section and the vehicle rear bumper illustrated in section.

FIGURE 6 is a horizontal sectional view taken on an enlarged scale on the lines 6—6 in FIGURE 5.

FIGURE 7 is a fragmentary side elevational view of the automobile with the collapsible frame and tent canopy in the stowed position on top of the trunk lid.

Referring more particularly to the drawings and for the present to the collapsible tent frame, 10 and 11 designate end arches which are supported upon support standards 12 and 13. These arches are connected together centrally at their highest portions by ridge pole sections 14 and 15 which are hinged or pivoted by brackets 16 and 17 to the respective arches and have associated with the brackets abutments 18 and 19 which are adapted to be engaged by the ridge pole sections 14 and 15 when they are in the raised horizontal position to prevent further upward movement of such sections.

Between sections 14 and 15 is a central hinge 22 having mutual hinge abutments 23, 24 which are defined by surfaces perpendicular to the axes of sections 14 and 15 and which are adapted to close together upwardly in the raised horizontal position of the ridge pole sections in which position these sections are in substantial alignment.

The sections 14 and 15 carry latch elements 25, 26 having shanks 27 for receiving rivets 28 or other fastenings by which the latch elements are attached to the sections 14 and 15 on the under sides thereof. These elements also include bow detents 29 with curved cam free edges 30 for encountering the curved cross-sections of the locking bows 31, 32, it being understood that the frame is preferably made of tubing advantageously of aluminum metal for lightness. The bows 31, 32 include side arms 31ᵃ and 32ᵃ which are connected by pivots 33, 34 to the support standards 12 and 13.

Besides the ridge pole the end arches 10 and 11 are also connected together and braced apart in the set up condition by side rail sections 36, 37 and 38, 39 connected respectively by hinges 40, 41, 42 and 43 to the support standards 12 and 13 at the lower portions thereof. Associated with these hinges or pivots 40, 41 and 42, 43 are hinged abutments 44 and 45, defined by surfaces perpendicular to the sections 36 and 37, and adapted to abut against the standards 12 and 13 in the lower horizontal positions of the rail sections 36, 37 and 38, 39.

These rail sections are connected to one another by central hinges 46 having hinge abutments 47, 48, also defined by surfaces perpendicular to the sections 36 and 37, abutting in the downward movement of the rail sections when the sections reach a final horizontal position to avoid any further downward movement of the same.

The collapsible frame also includes an outer base section 49 comprising a bottom rail 50 having at its ends upright legs 51 pivoted at 52 to the lower ends of the standards 12. The upper ends of these legs 51 constitute abutments 53 which encounter the lower ends of the standards 12 when the legs 51 are in the vertical position.

The device also includes an inner base section forming an attaching unit comprising legs 55 connected by pivots or hinges 56 to the lower ends of the standards 13. These legs 55 have at their upper ends abutments which engage the lower ends of the standards 13 in the vertical position of the legs.

These legs 55 are secured in adjustable clamp jaws 58 (FIG. 6) held together in clamping relation upon legs 55 by bolts 60 or other fastening means. These bolts also secure the clamp jaws 58 to horizontal stub bars 61 which are slidable in sleeves 62 of lower clamps 63 having lower bumper hooks 64 adapted to slip over the lower flange 65 of the rear bumper 66 of the automobile. Set screws 67 pass through the sleeves 62 for affixing the same to the stub bars 61 in various positions of horizontal adjustment for locating the legs 55 and incidentally the tent frame toward or away from the bumper 66. The sleeves 63 also carry lower chain hooks 68 with which are detachably or otherwise connected the lower ends of the chains 69, also engaged at their upper ends on upper chain hooks 70 carried by adjustable blocks 71. These latter blocks 71 are carried by adjustable screw bolts 72 or the like threaded through threaded openings in upper clamps 73. These upper clamps 73 have upper bumper hooks 74 for hooking onto the upper bumper flange 75.

In FIGURES 1 and 7 a vehicle is indicated at 76 having a trunk lid 77 onto which the collapsible frame and the flexible and pliable canvas canopy 78 are adapted to rest, being secured thereto by the straps 80 or other suitable fastenings.

If desired, a suitable floor 79 of canvas or the like may be provided for the enclosure.

In the use of the device, the clamps 63, 73 are affixed to the vehicle rear bumper and thereon the screws 72 are operated to draw the chains 69 taut whereby the clamps 64, 74 will be firmly retained in place. The bolt 60 may then be loosened to permit the legs 55 to be adjusted up or down on the clamp 58 in order to bring the pivot or hinge point 56 to an elevation at least as high as the upper surface of the trunk lid 77 so that the tent frame in the collapsed condition may be rotated on these pivots 56 to bring the frame to a position of rest on the top of the trunk lid as indicated in FIGURE 7. In this position the outer base section 49 may be swung over on its pivots 52 to rest upon the standards 12.

FIGURE 4 shows the partially collapsed position of the frame minus the canopy for clearance. Here it will be seen that the ridge pole sections 14, 15 fold downwardly about their pivot connections 16, 17 with the end arches, while the side rails 36, 37 and 38, 39 fold only upwardly about the pivot points 40, 41. In executing these movements the hinge abutments 23, 24 and 47, 48 open and separate as indicated in this FIGURE 4 as do also the hinge abutments 18, 19 and 20, 21 showing that these various articulated members can open and fold in one direction but after attaining their set-up position as shown in FIGURE 2 they are locked by these abutments against any further swinging movement in the direction of set up.

Although I have disclosed herein the best form of the invention known to me at this time, I reserve the right to all such modifications and changes as may come within the scope of the following claims.

What is claimed is:

1. For use with a canvas canopy a collapsible tent frame for automobiles comprising, a pair of bow shaped canvas supporting end members each having an upper major portion and a lower minor portion pivotally interconnected, side spacer members each pivoted to said end members and having a pivotal mid point, a top spacer member pivoted to each of said end members and having a pivotal mid point, means connecting said end members and said top member to maintain said top member in a straight line along its length, and attaching means slidably carried by the minor portion of one of said end members for attachment to the rear bumper of a motor vehicle whereby the frame in collapsed condition may be stored upon the top of the trunk of the vehicle without obstructing the view of the driver.

2. A collapsible tent frame for automobiles as claimed in claim 1 wherein said means connecting said end members and said top member is an inverted U-shaped bow pivoted to said end members at its free ends and clip means carried by said top member to engage the bow of each member.

References Cited in the file of this patent
UNITED STATES PATENTS

| | | |
|---|---|---|
| 907,032 | Gohen | Dec. 15, 1908 |
| 1,413,098 | Cooper | Apr. 18, 1922 |
| 1,446,296 | Irvin | Feb. 20, 1923 |
| 2,615,458 | Jones | Oct. 28, 1952 |
| 2,642,587 | Taylor | June 23, 1953 |
| 2,828,757 | Thaxton | Apr. 1, 1958 |